(12) United States Patent
Stölzle

(10) Patent No.: US 8,371,760 B2
(45) Date of Patent: Feb. 12, 2013

(54) ROLLING BEARING

(75) Inventor: Jürgen Stölzle, Erlangen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 740 days.

(21) Appl. No.: 12/448,864

(22) PCT Filed: Jan. 9, 2008

(86) PCT No.: PCT/EP2008/050174
§ 371 (c)(1),
(2), (4) Date: Jul. 9, 2009

(87) PCT Pub. No.: WO2008/090017
PCT Pub. Date: Jul. 31, 2008

(65) Prior Publication Data
US 2010/0092123 A1    Apr. 15, 2010

(30) Foreign Application Priority Data
Jan. 26, 2007  (DE) .......................... 10 2007 003 970

(51) Int. Cl.
*F16C 19/30* (2006.01)
(52) U.S. Cl. ........................................ 384/618; 384/619
(58) Field of Classification Search ............... 384/590, 384/593, 618, 619, 622; 248/317, 323, 343
See application file for complete search history.

(56) References Cited

U.S. PATENT DOCUMENTS

| | | | | |
|---|---|---|---|---|
| 1,059,504 A * | 4/1913 | Teppert | ........................... | 403/116 |
| 3,015,793 A * | 1/1962 | Fraser et al. | ................... | 338/162 |
| 3,606,502 A * | 9/1971 | Germond | ....................... | 384/501 |
| 2005/0282673 A1* | 12/2005 | Knappe et al. | ................ | 474/198 |

FOREIGN PATENT DOCUMENTS

| | | |
|---|---|---|
| DE | 1 481 111 | 9/1966 |
| DE | 1 525 140 | 6/1969 |
| DE | 240 089 A1 | 8/1985 |
| DE | 3627517 A1 | 4/1988 |
| DE | 198 03 929 A1 | 8/1999 |
| DE | 101 41 113 A1 | 3/2003 |
| DE | 20 2005 008 264 U1 | 9/2005 |
| DE | 10 2005 000 754 B3 | 10/2006 |
| FR | 2 549 174 | 7/1983 |
| FR | 2 693 102 | 12/1992 |
| JP | 3-20114 | 1/1991 |
| WO | WO 01/45627 A1 | 6/2001 |

* cited by examiner

*Primary Examiner* — Phillip A Johnson
(74) *Attorney, Agent, or Firm* — Volpe and Koenig, P.C.

(57) ABSTRACT

A rolling bearing, particularly a slewing connection (1), comprising an outer bearing ring (2) and an inner bearing ring (3) and rolling elements arranged between said outer and inner bearing rings for rolling contact with associated raceways, a stop means for limiting an angle of rotation of the rolling bearing being arranged within the rolling bearing, whereby a first solution offered by the invention, the outer bearing ring (2) comprises on an inner peripheral surface a recess (14) which extends in peripheral direction and is limited at two ends by a first stop lug (15), the inner bearing ring (3) comprises on an outer peripheral surface a guide groove (16) which extends in peripheral direction and is limited at two ends by a second stop lug (17), and a guide element (18) arranged in the guide groove (16) connects the inner and outer bearing rings (3,2) to each other by positive engagement.

18 Claims, 4 Drawing Sheets

_US 8,371,760 B2_

ROLLING BEARING

This application is a 371 of PCT/EP2008/050174 filed Jan. 9, 2008.

FIELD OF THE INVENTION

The invention concerns a rolling bearing, particularly a slewing connection, comprising an outer bearing ring and an inner bearing ring and rolling elements arranged between said outer and inner bearing rings for rolling contact with associated raceways, a stop means for limiting an angle of rotation of the rolling bearing being arranged within the rolling bearing.

BACKGROUND OF THE INVENTION

Rolling bearing slewing connections of the pre-cited type are known in the prior art. The textbook "Die Wälzlagerpraxis" (Rolling bearing practice), Vereinigte Fachverlage GmbH, Mainz 1995 teaches that rolling bearing slewing connections of the pre-cited type are used as pivoting bearings for the support of excavators, cranes and in the field of automotive vehicles for articulated buses and streetcars, i.e. in fields of use in which, in a limited design space, high loads occur and where a high degree of operative safety is demanded. These slewing connections can take up axial forces, radial forces and tilting torques. Such slewing connections are further used in medical technology, robotics and military engineering.

These pivoting bearings are configured as four-point bearings which are particularly well-suited for supporting tilting forces on a small cross-section. Joints of industrial robots and other bearing applications that overtax the bearing capacity and rigidity of ball bearings are preferably equipped with cross roller bearings. These bearings comprise a crown ring filled with rollers with an approximately square cross-section and roll in alternation on offset axes on the rolling raceways. Such pivoting bearings are disclosed, for instance, in FR 2 594 174 A1 and in DE 15 25 140 A1.

As already mentioned above, such slewing connections are also used in the medical field and are mounted as disclosed, for example, in DE 36 27 517 A1, in so-called ceiling tripods or supports. It is common knowledge in this connection that, due to the transmission of data through electric leads or due to the transfer of liquids/gases through tubes, the angular displacement between the two rotating parts must be limited. This is necessary in order to prevent damage to the stewing connection through a twisting of the electric leads or the tubes. FIG. 2 of FR 2 693 102 A1 discloses a ceiling support which makes it clear that the supply ducts for medical gases or fluids through tubes should not be damaged by twisting.

Stops used in this technical field are known to the applicant. These are realized, for instance, in that stoppers that are used in both bearing rings serve as displacement limiters and prevent a twisting of the bearing rings relative to each other by coming to bear against each other when a certain angular position has been reached.

A drawback of this solution is that such mechanical limiters of angles of rotation do not allow the bearing rings to rotate through an angle larger than 360°, but this is required in many cases of use.

SUMMARY OF THE INVENTION

To overcome these drawbacks of the prior art, it is the object of the invention to provide a limiter for the angle of rotation of a rolling bearing that permits a rotation of the two components even through an angle larger than 360°.

The invention achieves this object by the fact that the outer bearing ring comprises on an inner peripheral surface a recess which extends in peripheral direction and is limited at two ends by a first stop lug, the inner bearing ring comprises on an outer peripheral surface a guide groove which extends in peripheral direction and is limited at two ends by a second stop lug, and a guide element arranged in the guide groove connects the inner and outer bearing rings to each other by positive engagement.

The enabled angle of rotation according to the invention results from an addition of the angular range of the recess in the outer bearing ring and the angular range of the guide groove in the inner bearing ring, so that this angle of rotation can attain a maximum range of 720° less the peripheral measures of the two stop lugs. Depending on the peripheral measures of the stop lugs, an angular range of about 15-690° can be achieved. Through the guide element arranged in the guide groove and in the recess, a positive movement of the interlocked rings is realized, the angle of rotation being determined by the spatial measures of the recess and the guide groove in peripheral direction and can be individually adapted to every single practical application.

According to another proposition, the object of the invention is likewise achieved by the fact that the inner bearing ring comprises on an outer peripheral surface a recess which extends in peripheral direction and is limited at two ends by a first stop lug, the outer bearing ring comprises on an inner peripheral surface a guide groove which extends in peripheral direction and is limited at two ends by a second stop lug, and a guide element arranged in the guide groove connects the inner and outer bearing rings to each other by positive engagement.

According to a further advantageous feature of the invention, the guide element is configured as a sliding shoe comprising a connected radially protruding pin which engages into the recess. Advantageously, the sliding shoe is made of a sliding material, for instance, brass, so that the sliding shoe can move with low friction in the guide groove.

According to still another feature of the invention, the recess and the guide groove possess an angular range of <360°. Due to this dimension of the angular ranges, such a slewing connection can be adapted in a simple manner to the desired angle of rotation in each practical case of use.

According to a further feature of the invention, the rolling elements are formed by bearing needle rollers of two oppositely oriented angular contact thrust needle roller bearings comprising thrust washers, a point of intersection of prolonged axes of rotation of the bearing needle rollers being situated in one of the inner bearing ring or the outer bearing ring. Compared to prior art slewing connections which, as described, are preferably configured as four-point or cross roller bearings, fabrication is substantially more economic when two angular contact needle roller bearings possessing the same or a higher load rating are used.

According to still another feature of the invention, the outer bearing ring comprises on an inner peripheral surface, a projection pointing toward the inner bearing ring, which projection forms support surfaces for the angular contact thrust needle roller bearings. Due to this geometric design, the outer bearing ring can be fabricated particularly simply and thus more economically.

According to still another feature of the invention, the inner bearing ring comprises on an outer peripheral surface, a recess for receiving the angular contact thrust needle roller bearings, into which a screw ring can be screwed. This screw ring enables the setting of the desired pre-stress of such a slewing connection in a simple manner.

According to another advantageous proposition of the invention, the bearing rings are made of a light metal, for example aluminum. By this, it is assured that such a rolling bearing slewing connection, while possessing a high stability, still has a low dead weight.

According to still another feature of the invention, the thrust washers and/or the pin are subjected to a hardening treatment. In this way, the durability of the rolling bearing slewing connection is enhanced with a simultaneously increased load supporting capacity.

Finally, according to a last feature of the invention, a rolling bearing of the invention can be used in a ceiling support for medical appliances.

Further features of the invention will become obvious from the following description and the appended drawings in which one example of embodiment of the invention is represented in a simple manner.

DETAILED DESCRIPTION OF THE INVENTION

Figure 1:
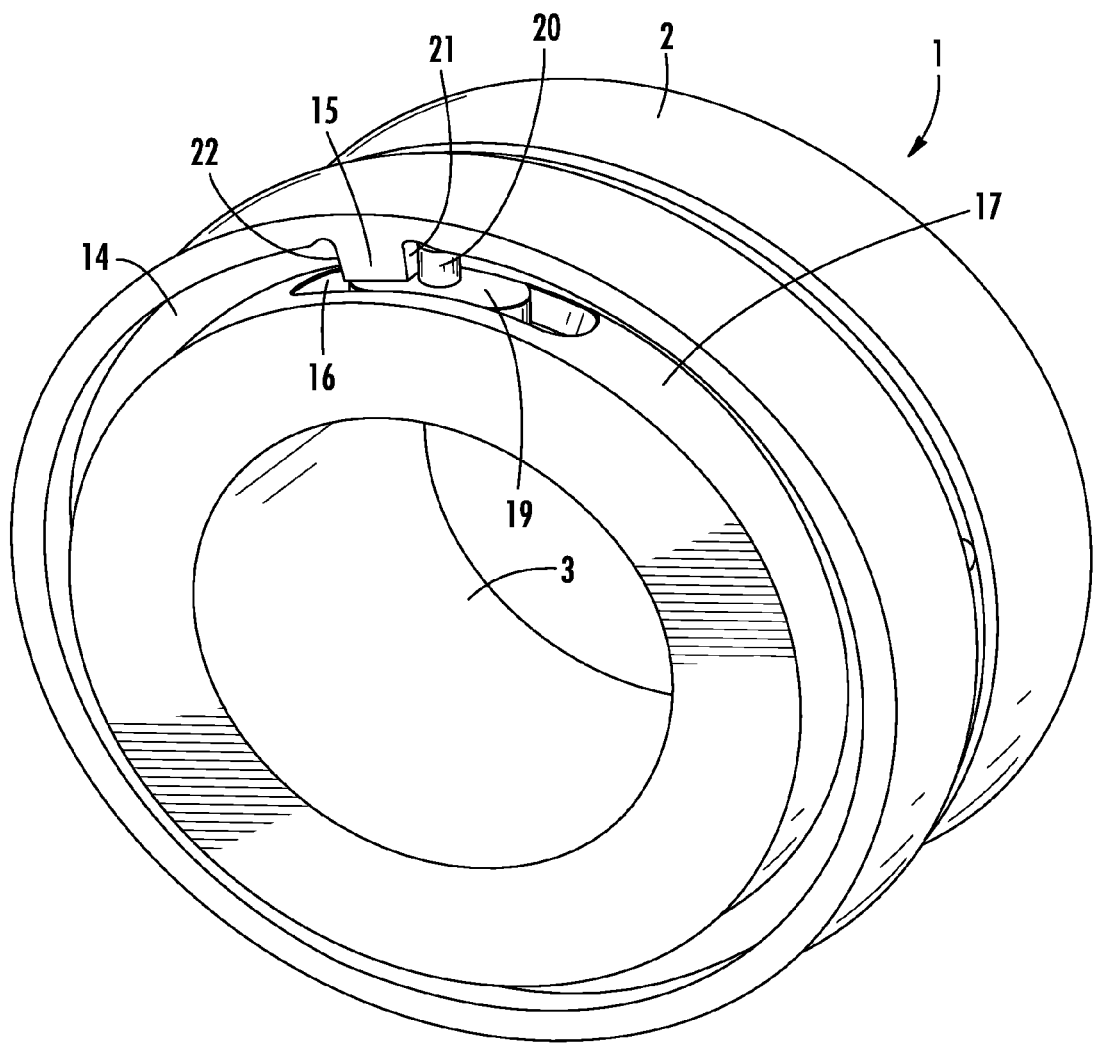
FIG. 1 is a perspective illustration of a rolling bearing slewing connection of the invention.
Figure 2:
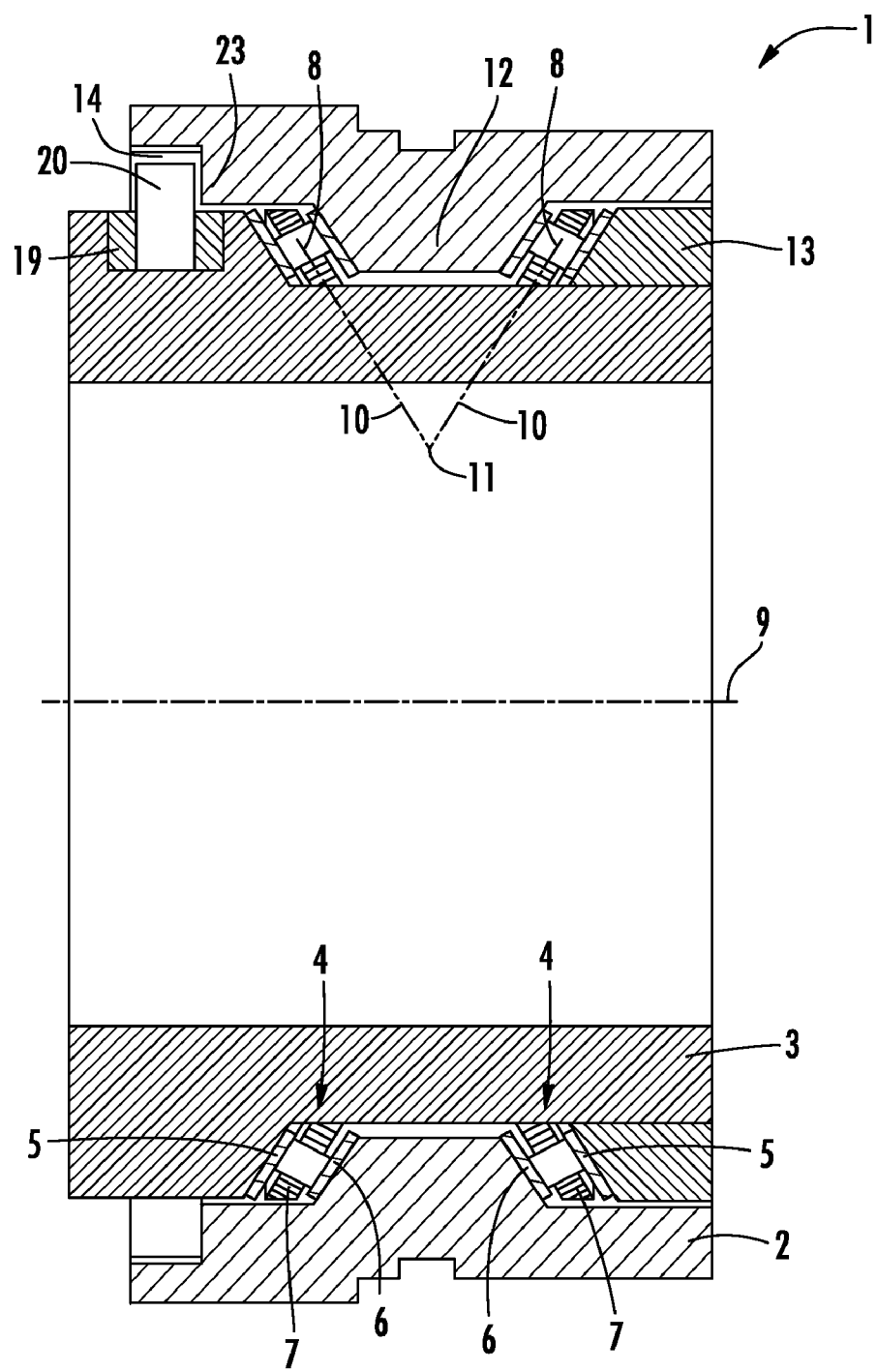
FIG. 2 shows a longitudinal section through a rolling bearing slewing connection of FIG. 1.
Figure 3:
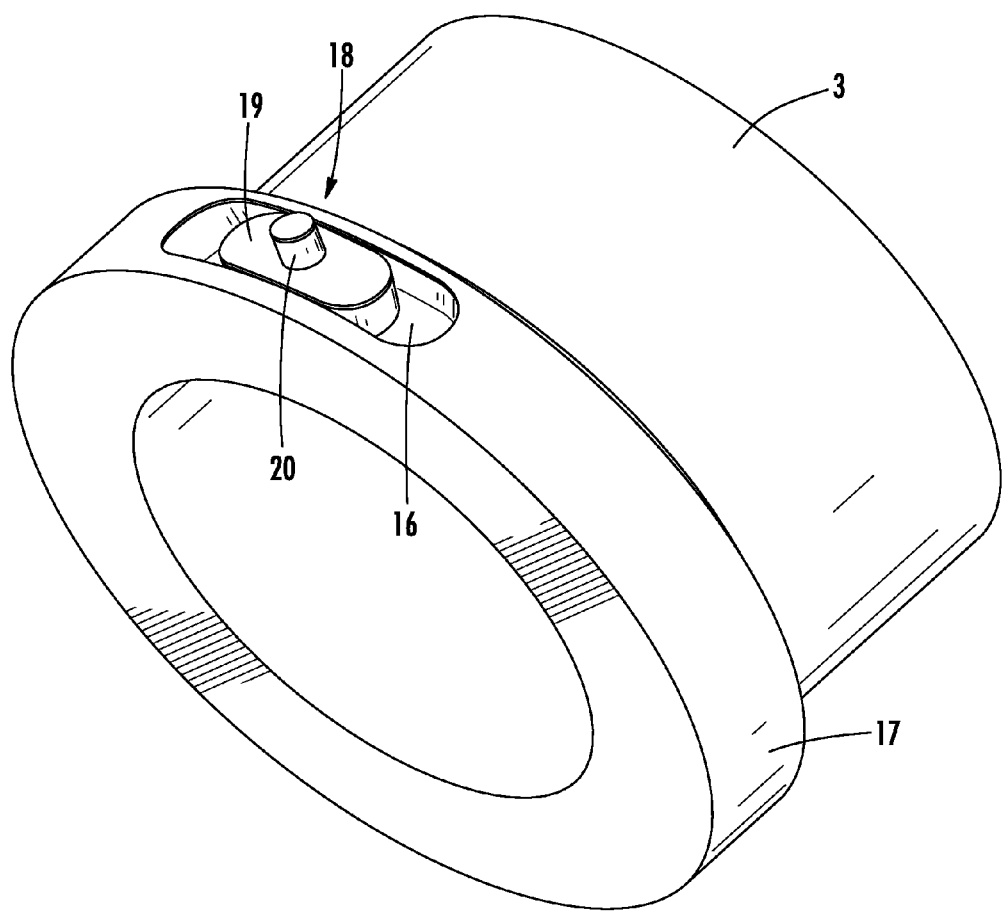
FIG. 3 is a perspective illustration of an inner bearing ring and FIG. 4 is a perspective illustration of an outer bearing ring of the rolling bearing slewing connection of the invention
Figure 4:
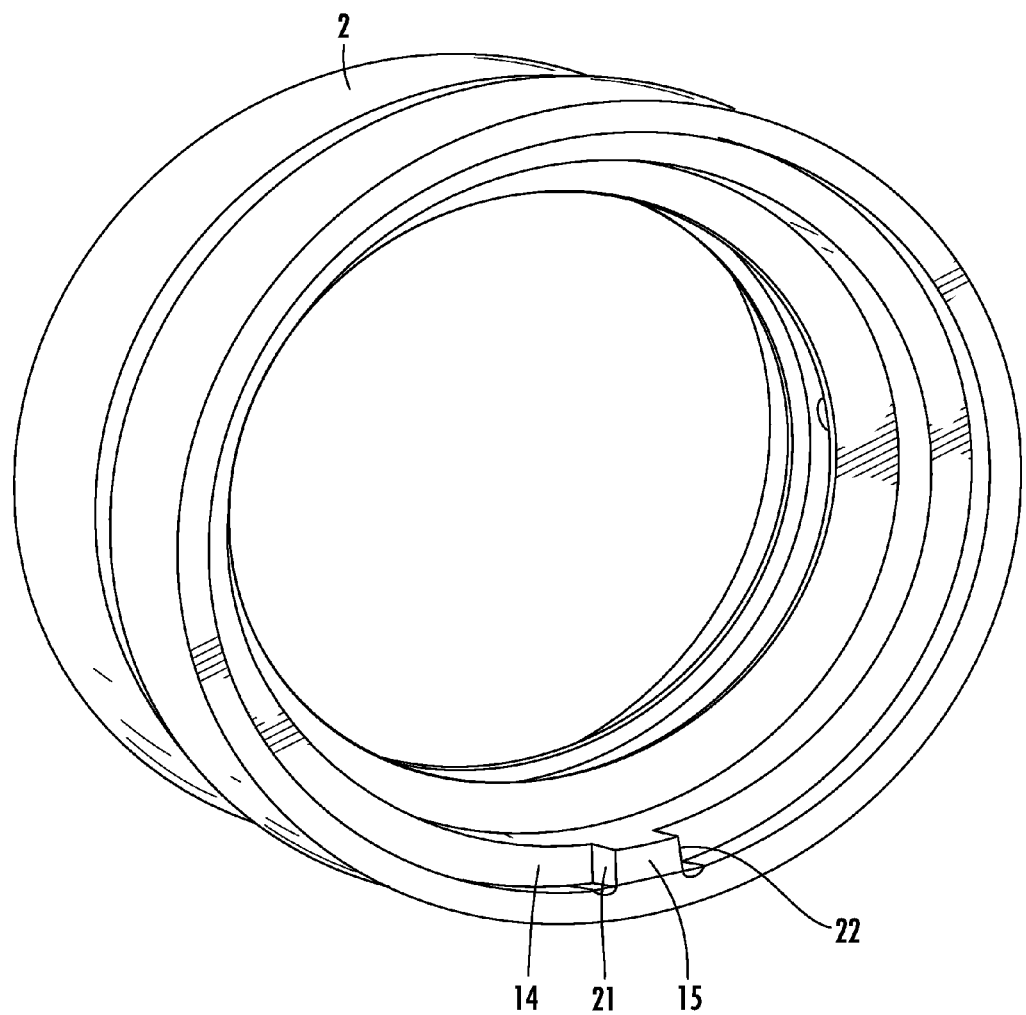

The slewing connection illustrated in FIGS. 1 and 2 and identified at 1 corresponds to the solution described in claim 1 and comprises an outer bearing ring 2 and an inner bearing ring 3 between which rings two oppositely oriented angular contact thrust needle roller bearings 4 are arranged. Each of these bearings comprises thrust washers 5, 6 between which bearing needle rollers 8 guided in respective cages 7 roll on associated raceways, not specified further. In the present example of embodiment, the angular contact thrust needle roller bearings 4 are oriented such that the prolonged axes of rotation 10 of the needle rollers 8 intersect at the point 11 within the inner bearing ring 3. The outer bearing ring 2 comprises a V-shaped projection 12 that serves as a support surface for the thrust washers 6. The slewing connection 1 further comprises a screw ring 13 that can be screwed through its inner thread, not shown, onto the inner bearing ring 3, so that the two angular contact thrust needle roller bearings 4 can be pre-stressed in a simple manner. It is obvious that, corresponding to the projection 12 of the outer bearing ring 2, the recess, not identified, of the inner bearing ring 3 for receiving the two angular contact thrust needle roller bearings 4 and the screw ring 13, must be configured such that all these components match each other.

As is further perceptible in FIGS. 1 to 4, the outer bearing ring 2 comprises in its left-hand region on its inner peripheral surface, an annular ring-shaped recess 14 extending in peripheral direction, the two ends, not identified, of this recess 14, being limited by a first stop lug 15. This annular ring-shaped recess 14 is open outwards in axial direction. A peripheral guide groove 16 arranged in the outer peripheral surface of the inner bearing ring 3 also plays a part in limiting the angle of rotation of the slewing connection 1. While in the present example of embodiment, the recess 14 extends almost over the entire periphery of the outer bearing ring 2, the guide groove 16 in the inner bearing ring 3 is configured on the periphery only in the region of an acute angle, so that the second stop lug 17 is very large. It is understood that a maximum angle of rotation of the slewing connection 1 can be realized both through a maximum dimension of the recess 14 and through a maximum dimension of the guide groove 16 in peripheral direction.

As will further be seen in the figures, a guide element identified at 18 comprises a sliding shoe 19 and a pin 20, the sliding shoe 19 being arranged in the guide groove 16 of the inner bearing ring 3. The guide shoe 19 is partially overlapped by a shoulder 23 of the outer bearing ring 2, so that the guide element 18 made up of the sliding shoe 19 and the pin 20 is retained secure against loss in the guide groove 16. The radially protruding pin 20 of the guide element 18 engages into the recess 14 of the outer bearing ring 2. Supposing now that the outer bearing ring 2 is stationary, the inner bearing ring 3 will be able to rotate at first till the pin 20 of the guide element 18 has been displaced from a right-hand side support surface 21 of the stop lug 15 to the left-hand side support surface 22. Following this, rotation can continue till the sliding shoe 19 comes to bear against one end of the guide groove 16.

For the sake of simplification, the alternative solution for achieving the object of the invention has not been illustrated in the figures. The main difference lies in a inversion of the arrangement of the recess 14 and the guide groove 16, which means that the recess 14 is not arranged on the outer bearing ring 2 but on the inner bearing ring 3, and the guide groove 16 is not arranged on the inner bearing ring 3 but on the outer bearing ring 2.

The invention claimed is:

1. A rolling bearing as a slewing connection, comprising an outer bearing ring and an inner bearing ring and rolling elements arranged between said outer and inner bearing rings for rolling contact with associated raceways, a stop that limits an angle of rotation of the rolling bearing, the stop being arranged within the rolling bearing, wherein the outer bearing ring comprises on an inner peripheral surface a recess which extends in peripheral direction and is limited at two ends by a first stop lug, the inner bearing ring comprises on an outer peripheral surface a guide groove which extends in peripheral direction and is limited at two ends by a second stop lug, and a guide element arranged in the guide groove connects the inner and outer bearing rings to each other by positive engagement.

2. A rolling bearing according to claim 1, wherein the guide element is configured as a sliding shoe comprising a connected radially protruding pin which engages into the recess.

3. A rolling bearing according to claim 1, wherein the recess and the guide groove possess an angular range of <360°.

4. A rolling bearing according to claim 1, wherein the rolling elements are formed by bearing needle rollers of two oppositely oriented angular contact thrust needle roller bearings comprising thrust washers, a point of intersection of prolonged axes of rotation of the bearing needle rollers being situated in one of the outer bearing ring or the inner bearing ring.

5. A rolling bearing according to claim 4, wherein the outer bearing ring comprises on an inner peripheral surface, a projection pointing toward the inner bearing ring, which projection forms support surfaces for the angular contact thrust needle roller bearings.

6. A rolling bearing according to claim 4, wherein the inner bearing ring comprises on an outer peripheral surface, a recess for receiving the angular contact thrust needle roller bearings, into which a screw ring is screwed.

7. A rolling bearing according to claim 4, wherein at least one of the thrust washers or the needle rollers are subjected to a hardening treatment.

8. A rolling bearing according to claim 1, wherein the bearing rings are made of a light metal.

9. A rolling bearing according to claim 1, wherein the rolling bearing is a ceiling support for medical appliances.

10. A rolling bearing as a slewing connection, comprising an outer bearing ring and an inner bearing ring and rolling elements arranged between said outer and inner bearing rings for rolling contact with associated raceways, a stop that limits an angle of rotation of the rolling bearing being arranged within the rolling bearing, wherein the inner bearing ring comprises on an outer peripheral surface a recess which extends in peripheral direction and is limited at two ends by a first stop lug, the outer bearing ring comprises on an inner peripheral surface a guide groove which extends in peripheral direction and is limited at two ends by a second stop lug, and a guide element arranged in the guide groove connects the inner and outer bearing rings to each other by positive engagement.

11. A rolling bearing according to claim 10, wherein the guide element is configured as a sliding shoe comprising a connected radially protruding pin which engages into the recess.

12. A rolling bearing according to claim 10, wherein the recess and the guide groove possess an angular range of <360°.

13. A rolling bearing according to claim 10, wherein the rolling elements are formed by bearing needle rollers of two oppositely oriented angular contact thrust needle roller bearings comprising thrust washers, a point of intersection of prolonged axes of rotation of the bearing needle rollers being situated in one of the outer bearing ring or the inner bearing ring.

14. A rolling bearing according to claim 13, wherein the outer bearing ring comprises on an inner peripheral surface, a projection pointing toward the inner bearing ring, which projection forms support surfaces for the angular contact thrust needle roller bearings.

15. A rolling bearing according to claim 13, wherein at least one of the thrust washers or the needle rollers are subjected to a hardening treatment.

16. A rolling bearing according to claim 13, wherein the inner bearing ring comprises on an outer peripheral surface, a recess for receiving the angular contact thrust needle roller bearings, into which a screw ring is screwed.

17. A rolling bearing according to claim 10, wherein the bearing rings are made of a light metal.

18. A rolling bearing according to claim 10, wherein the rolling bearing is a ceiling support for medical appliances.

* * * * *